US010305721B1

(12) United States Patent
Binns et al.

(10) Patent No.: US 10,305,721 B1
(45) Date of Patent: May 28, 2019

(54) CONTENT DELIVERY USING GOSSIP PROTOCOLS

(71) Applicant: Amazon Technologies, Inc., Seattle, WA (US)

(72) Inventors: Justin Michael Binns, Auburn, WA (US); Lars Christian Ulness, London (GB); James Eric Knowler, London (GB); Charles Benjamin Franklin Waggoner, Portland, OR (US); Terje Kristian Backman, Carnation, WA (US); Joshua B. Barnard, Seattle, WA (US); Marc Joliveau, Seattle, WA (US); Chris Longo, Seattle, WA (US); Matthew James Bordenet, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/565,226

(22) Filed: Dec. 9, 2014

(51) Int. Cl.
H04N 7/173 (2011.01)
H04L 29/06 (2006.01)
H04N 21/63 (2011.01)
H04L 29/10 (2006.01)
H04N 21/472 (2011.01)
H04N 21/262 (2011.01)
H04N 21/238 (2011.01)
H04N 21/24 (2011.01)
H04L 29/08 (2006.01)

(52) U.S. Cl.
CPC .. *H04L 29/06523* (2013.01); *H04L 29/06544* (2013.01); *H04L 29/08954* (2013.01); *H04L 29/10* (2013.01); *H04N 21/238* (2013.01); *H04N 21/2402* (2013.01); *H04N 21/26216* (2013.01); *H04N 21/47202* (2013.01); *H04N 21/631* (2013.01)

(58) Field of Classification Search
CPC .. H04N 21/63; H04N 21/632; H04N 21/6373; H04N 21/647; H04N 21/64738; H04L 29/08306
See application file for complete search history.

(56) References Cited

U.S. PATENT DOCUMENTS 5,708,659 A * 1/1998 Rostoker ............... G06F 13/128
                                                   348/E5.002
5,903,775 A * 5/1999 Murray .................... H04N 7/24
                                                   348/E7.073

(Continued)

OTHER PUBLICATIONS

U.S. Appl. No. 14/488,138, filed Sep. 16, 2014.

(Continued)

*Primary Examiner* — Pankaj Kumar
*Assistant Examiner* — Timothy R Newlin
(74) *Attorney, Agent, or Firm* — Weaver Austin Villeneuve & Sampson LLP

(57) ABSTRACT

Techniques are described for facilitating the delivery of digital content using gossip protocols. A group of client devices share information about network conditions in sideband communications using a gossip protocol. Each of the client devices then uses this information to make decisions about how to access content. By providing accurate and current information about network conditions the occurrence of buffering events and/or fatal errors may be significantly reduced or eliminated.

20 Claims, 3 Drawing Sheets

(56) References Cited

U.S. PATENT DOCUMENTS

| | | | | |
|---|---|---|---|---|
| 6,181,711 | B1* | 1/2001 | Zhang | H04M 11/062 370/468 |
| 6,775,023 | B1* | 8/2004 | Fukunaga | H04N 1/32427 358/1.15 |
| 6,968,388 | B1* | 11/2005 | Fuldseth | H04N 21/2181 375/E7.137 |
| 7,100,192 | B1* | 8/2006 | Igawa | H04L 29/06027 709/217 |
| 2004/0111441 | A1* | 6/2004 | Saito | G06F 17/30206 |
| 2006/0218217 | A1* | 9/2006 | Ganesan | H04N 7/17318 709/200 |
| 2007/0056002 | A1* | 3/2007 | Ganesan | H04L 29/06027 725/95 |
| 2007/0277182 | A1* | 11/2007 | Chen | H04N 7/17318 719/315 |
| 2008/0037527 | A1* | 2/2008 | Chan | H04L 67/104 370/353 |
| 2008/0281913 | A1* | 11/2008 | Shankar | H04N 7/17354 709/204 |
| 2009/0248872 | A1* | 10/2009 | Luzzatti | H04L 29/06027 709/226 |
| 2010/0011103 | A1* | 1/2010 | Luzzatti | H04L 29/06027 709/226 |
| 2010/0043044 | A1* | 2/2010 | Li | G06T 7/0002 725/118 |
| 2010/0049864 | A1* | 2/2010 | Lu | H04N 7/17318 709/231 |
| 2011/0191418 | A1* | 8/2011 | Yang | H04N 21/47202 709/204 |
| 2011/0251890 | A1* | 10/2011 | Xu | G06Q 30/02 705/14.44 |
| 2012/0120798 | A1* | 5/2012 | Jacquet | H04L 43/0882 370/230 |
| 2014/0143814 | A1* | 5/2014 | Fujimoto | H04N 21/2343 725/80 |
| 2014/0241315 | A1* | 8/2014 | Niu | H04L 67/1091 370/331 |
| 2014/0244763 | A1* | 8/2014 | Su | H04L 67/1057 709/205 |

OTHER PUBLICATIONS

U.S. Appl. No. 14/503,190, filed Sep. 30, 2014.
Das, et al., "SWIM: Scalable Weakly-consistent Infection-style Process Group Membership Protocol," Dept. of Computer Science, Cornell University, PDF created Apr. 8, 2002, 10 pages.
Leslie Lamport, "The Part-Time Pariliament," ACM Transactions on Computer Systems 16, 2 (May 1998),Minor corrections made Aug. 29, 2000, 33 pages.

\* cited by examiner

CONTENT DELIVERY USING GOSSIP PROTOCOLS

BACKGROUND

The infrastructure by which digital content is consumed is extremely complex, presenting a number of technical challenges to content providers in giving their users what they want; on-demand access to high quality content wherever they are located. The channels by which digital content is delivered are highly sensitive to changing network conditions. Network traffic patterns and resulting fluctuations in available bandwidth can cause buffering events and fatal errors that adversely impact the user experience. Success in the content delivery marketplace will depend on the ability of content providers to reduce or eliminate such events.

DETAILED DESCRIPTION

This disclosure describes techniques for facilitating the delivery of digital content using gossip protocols. A group of client devices share information about network conditions in sideband communications using a gossip protocol. Each of the client devices then uses this information to make decisions about how to access content. Such decisions might include, for example, selection of the source from which content is streamed or downloaded, the protocol or delivery mode used to access the content, selection of content fragments, etc. By providing accurate and current information about network conditions the occurrence of buffering events and/or fatal errors may be significantly reduced or eliminated. The techniques enabled by the present disclosure may be used to improve the delivery of content in conjunction with other techniques intended to improve content delivery, e.g., server-side heuristics. However, it should be understood that the techniques described herein may also be used without regard to such heuristics. Some examples may be illustrative.

In one example, a group of client devices might share information about the edge servers they are using to access content, their achieved bit rates, and the reliability of the connections. Using this information, each client device can make decisions about the best edge server to use to ensure a positive user experience. In another example, client devices behind a firewall or sharing a proxy cache might share information about the content they are consuming, thereby enabling discovery and access by individual client devices of desired content that has already been cached nearby. As will be appreciated, at least some of the implementations enabled by the present disclosure are advantageous in that they can drive delivery costs down while simultaneously improving the user experience.

Figure 1:
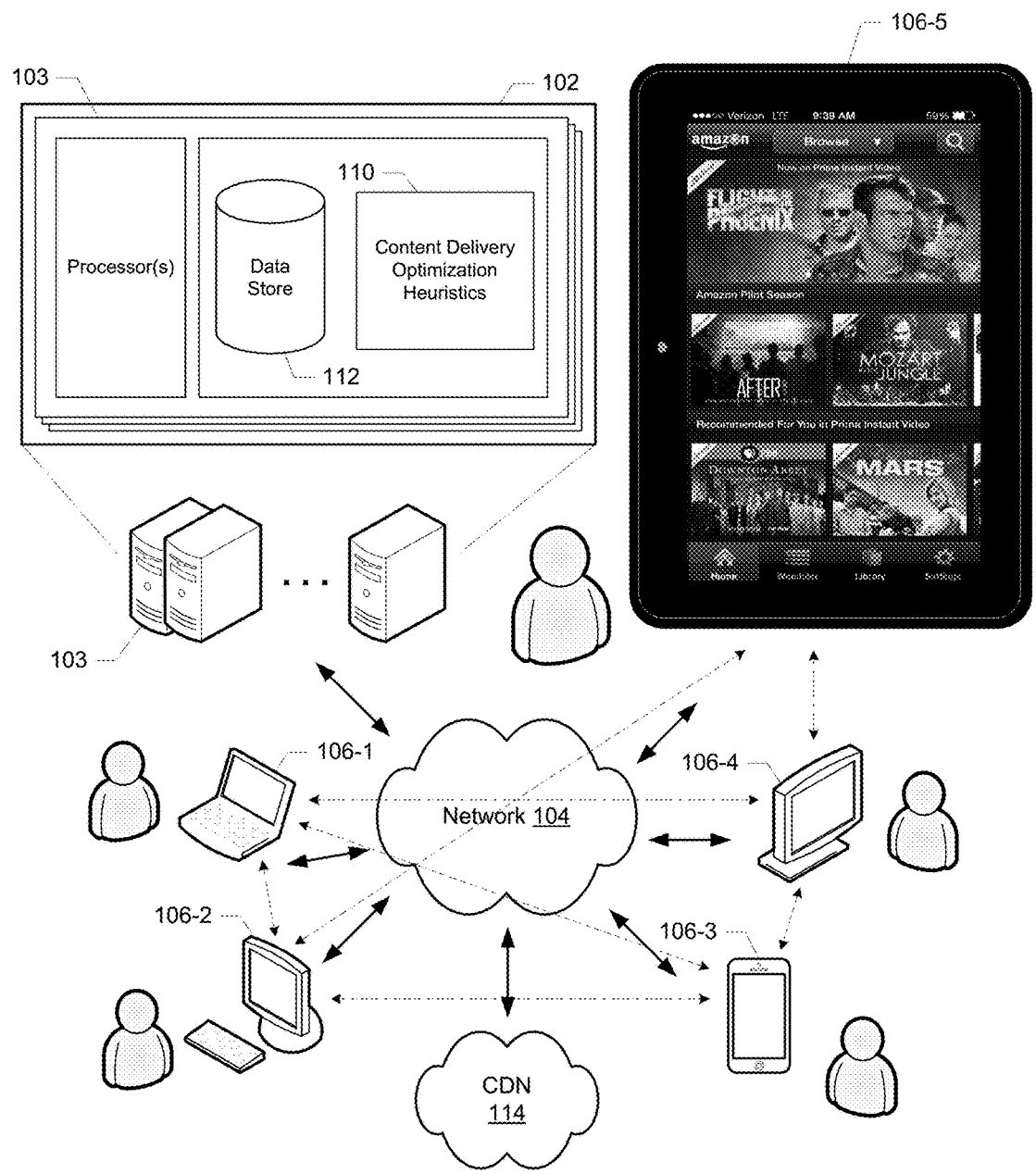
FIG. 1 is a simplified diagram of a computing environment in which various implementations may be practiced.

FIG. 1 illustrates an example of a computing environment in which a content service 102 provides content via network 104 to a variety of client devices (106-1 through 106-5) associated with users in accordance with the techniques described herein. Content service 102 (which may provide video and/or audio content) may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, satellite networks, public networks, private networks, wide area networks, local area networks, the Internet, the World Wide Web, intranets, extranets, etc. Client devices 106 may be any suitable device capable of connecting to network 104 and consuming content provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 102. Alternatively, such resources may be independent of content service 102, e.g., on a platform under control of a separate provider of computing resources with which content service 102 connects to consume computing resources as needed.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

In the following examples, content service 102 may be described as if it were integrated with the platform(s) that provides the content to client devices. Alternatively, content service 102 may provide access to content in conjunction with one or more content delivery networks (e.g., CDN 114) that may or may not be independent of content service 102. It should also be noted that the basic principles described herein may be employed with any of a variety of codecs including, for example, MPEG-1, MPEG-2, MPEG-4 Part 2, VC-1, H.263, VP9, H.264, and H.265 (also commonly referred to as HEVC). Other variations known to those of skill in the art are contemplated to be within the scope of the invention.

Implementations enabled by the present disclosure contemplate logic resident on the client devices consuming content from content service 102; such logic being configured to make decisions using information shared with other client devices using a gossip protocol. The logic might be implemented, for example, in a media player on the client device or as a separate application resident on the client device. However, it should be noted that implementations are also contemplated in which content service 102 includes logic that facilitates at least some aspects of the delivery of content as described herein (e.g., content delivery optimization heuristics 110). Content service 102 may also include user account information (e.g., in data store 112) as well as business logic (not shown) that governs the operation of the service and management of user accounts. According to some implementations, data store 112 may also include the content (including associated manifest files) to which service 102 provides access. Alternatively, content may be provided and/or hosted by one or more separate platforms, e.g., CDN 114. It should be noted that, while content delivery optimization heuristics 110 and data store 112 are contemplated as integrated with content service 102, implementations are contemplated in which either or both operate remotely from the associated content service, and/or either or both are under the control of an independent entity.

Figure 2:
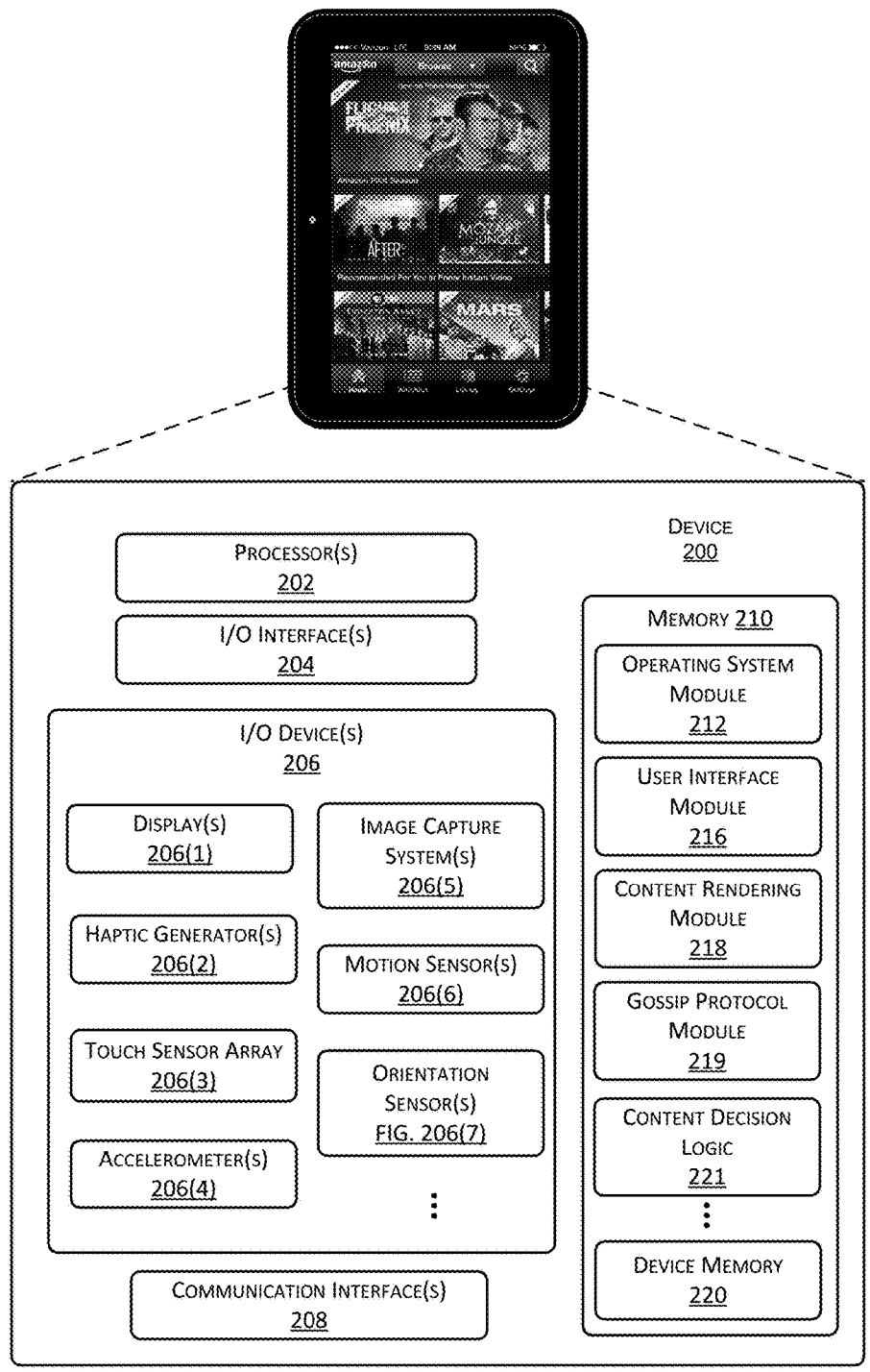
FIG. 2 is a simplified diagram of a client device with which various implementations may be practiced.

A block diagram of an example of a client device 200 suitable for use with various implementations is shown in FIG. 2. Device 200 includes one or more single or multi-core processors 202 configured to execute stored instructions (e.g., in device memory 220). Device 200 may also include one or more input/output (I/O) interface(s) 204 to allow the device to communicate with other devices. I/O interfaces 204 may include, for example, an inter-integrated circuit (I2C) interface, a serial peripheral interface (SPI) bus, a universal serial bus (USB), an RS-232 interface, a media device interface, and so forth. I/O interface(s) 204 is coupled to one or more I/O devices 206. The I/O device(s) 206 may include one or more displays 206(1), one or more haptic generators 206(2), a touch sensor array 206(3), one or more accelerometers 206(4), one or more image capture systems 206(5), one or more motion sensors 206(6), one or more orientation sensors 206(7), microphones, speakers, and so forth. The one or more displays 206(1) are configured to provide visual output to the user and may comprise any of a variety of display types including, for example, any type of reflective or transmissive display. Touch sensor array 206(3) may be a capacitive sensor array having a matrix of conductors that are scanned to determine, for example, the location, duration, speed and direction of touch events within the matrix based on changes in electrical capacitance.

Device 200 may also include one or more communication interfaces 208 configured to provide communications between the device and other devices including, for example, communications with remote platforms (e.g., content service 102, CDN 114, etc.) for the purpose of streaming or downloading content, as well as communications in accordance with one or more gossip protocols by which information is shared among client devices as described herein. Such communication interface(s) 208 may be used to connect to cellular networks, personal area networks (PANs), local area networks (LANs), wide area networks (WANs), and so forth. For example, communications interfaces 208 may include radio frequency modules for a 3G or 4G cellular network, a WiFi LAN and a Bluetooth PAN. Device 200 also includes one or more buses or other internal communications hardware or software that allow for the transfer of data and instructions between the various modules and components of the device.

Device 200 also includes one or more memories (e.g., memory 210). Memory 210 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 210 provides storage for computer readable instructions, data structures, program modules and other data for the operation of device 200. Memory 210 includes at least one operating system (OS) module 212 configured to manage hardware resources such as I/O interfaces 204 and provide various services to applications or modules executing on processor(s) 202. Memory 210 also includes a user interface module 216, a content rendering module 218, and other modules.

Memory 210 also includes device memory 220 to store a wide variety of instructions and information using any of a variety of formats including, for example, flat files, databases, linked lists, trees, or other data structures. Such information includes content for rendering and display on display 206(1) including, for example, any type of video or image content. In some implementations, a portion of device memory 220 may be distributed across one or more other devices including servers, network attached storage devices, and so forth.

The logic or computer program instructions that enable the sharing of information among client devices (represented by gossip protocol module 219) may be implemented in a variety of ways. For example, at least some of this functionality may be implemented as part of the code of a media player operating on device 200. Alternatively, gossip protocol module 219 may be implemented separately from the device's media player. And as mentioned above, implementations are contemplated in which the information derived by gossip protocol module 219 may be augmented or used in conjunction with information derived on a separate platform, e.g., service 102, CDN 114, etc. Similarly, the logic or computer program instructions that enable decision making based on the shared information (represented by content decision logic 221) may be integrated with or implemented separately from the device's media player. Suitable variations and alternatives will be apparent to those of skill in the art. It will also be understood that device 200 of FIG. 2 is merely an example of a device with which various implementations of the present invention may be practiced, and that a wide variety of other devices types may also be used (e.g., devices 106-1 to 106-5). The scope of the invention should therefore not be limited by reference to device-specific details.

Figure 3:
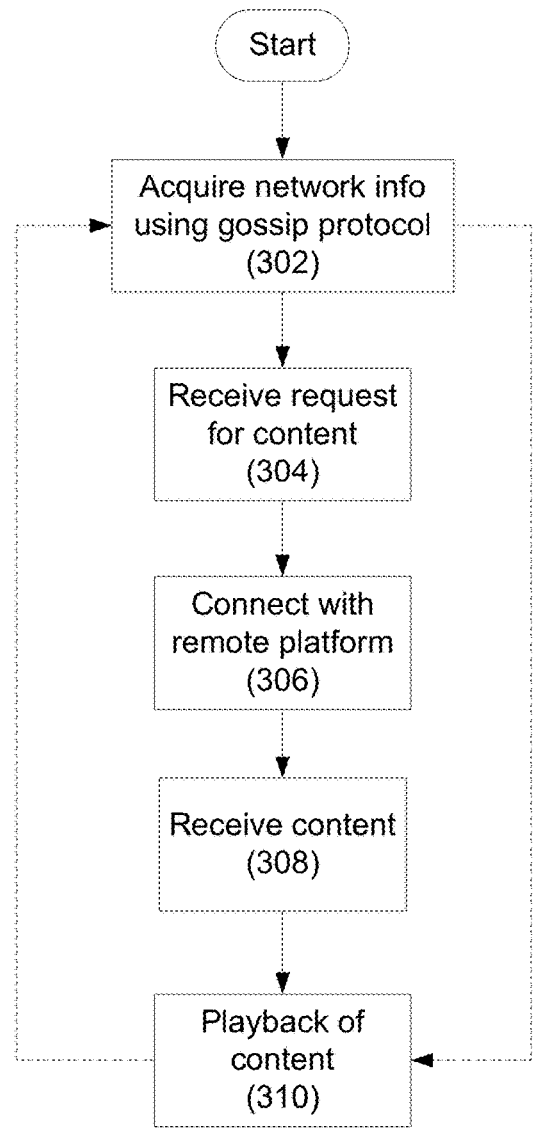
FIG. 3 is a flow diagram illustration operation of a particular class of implementations.

The sharing of information via a gossip protocol and the delivery of content to a client device according to a particular implementation is illustrated in the flow chart of FIG. 3. This example assumes a media player on the client device that includes or works in association with logic (e.g., module 219 of FIG. 2) configured to communicate with other client devices in a network using the gossip protocol to acquire information about one or more network conditions relating to delivery of content in the network (302). This is represented in FIG. 1 by the dashed arrows between client devices 106-1 through 106-5. Details about the various ways in which this information may be acquired are discussed below. When the media player receives a request for playback or download of particular content (304), e.g., selection of a video title via the user interface of the media player, the media player connects with a remote platform (306), e.g., content service 102, CDN 114, etc., receives the content from the remote platform (308), e.g., via streaming or downloading, and initiates playback of the content on the client device (310). As will be described, the manner in which the media player accesses the content is based, at least in part, on one or more decisions that refer to and/or depend on the information acquired via the gossip protocol. Further, the acquisition of network information via the gossip protocol as well as the decision making regarding accessing of the content may be iterative and may continue to occur during and affect acquisition and/or playback of the content (as indicated by the dashed arrows).

According to various implementations, the information about network conditions that is shared among client devices supports better decision making (e.g., by content decision logic 221 of FIG. 2) in accessing content than might be made individually by each client device in the absence of such information. It should be noted that this decision making can relate to any of a wide variety of decisions that are made in the course of accessing the content. For example, as mentioned above, one such decision might involve the selection of a particular source from which the media player streams or downloads the content; the selection being guided, for example, by information about the performance of possible sources, e.g., as reported by achieved bit rates of neighboring client devices. As will be appreciated by those of skill in the art, and with reference to examples described below, this is but one example of a large diversity of use cases contemplated by the present disclosure.

Gossip protocols (also referred to as dissemination protocols, epidemic protocols, or aggregation protocols) are communication protocols that enable communication among entities (typically peers) in a computing network for the purpose of spreading information, data sharing/redundancy, and/or collective problem solving. BitTorrent is an example of a generalized gossip protocol typically employed for data sharing. Another example is the SWIM protocol described in the paper entitled *SWIM: Scalable Weakly-consistent Infection-style Process Group Membership Protocol* by Abhinandan Das, Indranil Gupta, and Ashish Motivala, Proceedings of the 2002 IEEE International Conference on Dependable Systems and Networks (DSN 2002), Washington D.C., June 2002, the entire disclosure of which is incorporated herein by reference for all purposes. Examples of other suitable gossip protocols will be identifiable by those of skill in the art.

A typical gossip protocol involves periodic, pairwise, inter-process interactions by which information is exchanged such that, when the entities or nodes sharing information interact, the state of at least one of the entities changes to reflect the state of the other. Unlike the conventional uses mentioned above, the present disclosure enables the use of gossip protocols for sharing information about network conditions as they relate to accessing content. Rather than sharing the content itself, information is shared about the content and/or the client devices that are consuming it to better leverage existing network resources to optimize the streaming and/or downloading of content. As will be appreciated, different client devices might be aware of different subsets of the other client devices in the network. For example, each client device might know a small number of its neighbors, and by exchanging information with just those neighbors, eventually all of the client devices have access to the complete information set; whatever might be included in that for a given application.

According to various implementations, the size of the network region or set of client devices across which information is shared can vary considerably (e.g., from worldwide to the zone of a single wireless access point or firewall). Some examples of network regions or client device sets that are useful in the context of particular implementations include a group of client devices sharing a common Internet service provider (ISP), a group of clients sharing a common cell carrier, a group of client devices within a geographic area such as a state or a country, a group of client devices behind the same firewall, a group of client devices using the same access point or cell tower, a group of client devices sharing the same proxy cache, a group of client devices sharing the same CDN edge cache, etc.

In implementations in which the client device set is defined by a common ISP, information about the internal routing of the ISP (typically opaque to content providers) can be used as input to decision making logic. The internal routing of an ISP (which may have a nationwide network) is typically based on what is optimal for the ISP (e.g., in terms of peering costs). Surfacing this information via a gossip protocol enables client devices to make decisions about where and how to connect that are best for the client devices. For a small, geographically local ISP, the client devices in a particular geographic neighborhood might all decide to connect with a local edge server for a particular CDN because of its geographic proximity.

Discovery of other client devices in the relevant client device set may occur in a number of ways. For example, the gossip protocol logic on a client device (e.g., whether stand-alone or integrated with the device's media player) might employ a broadcast mechanism to announce its presence and to share its information about network conditions. To identify the relevant client device set and/or determine what information is relevant, a client device might look at the IP address(es) from which it is receiving content for comparison with information from other client devices to determine whether they are sharing an ISP, and edge cache, etc.

A client device might also be able to find other client devices with similar characteristics (e.g., location, connectivity, shared provider(s), device type and/or capabilities, etc.). This could be done on a peer-to-peer basis or, alternatively, by the client devices reporting back to a central server which then alerts a group of client devices that they are neighbors. In some cases, an initial client device set can be provided to each client device (e.g., from a central server) that includes a small number of potential neighbors that the server determines because it has visibility into the relevant characteristics of each client device. The size of the initial set with which each client device is seeded is selected such that the complete/relevant information set can become known to each client device in the set within an acceptable period of time.

The nature of the information shared among clients can vary considerably. For example, the information can be very narrowly targeted such that each client device only provides information in which its neighbors are interested. Alternatively, each client device can share everything it knows with each of its neighbors. In this latter case, each client device might be configured to determine what information is useful and ignore everything else. Examples of the types of information that might be shared include achieved bit rates, packet blocked data, edge device connections, content sources, content identifiers (e.g., titles), routing information (e.g., trace route data), access errors, failed connections, unreliable sources (e.g., broken URLs), Transmission Control Protocol (TCP) window sizes, maximum transmission unit (MTU) values, current stream characteristics (e.g., what one client is currently streaming might be useful for other nearby clients who will know, for example, that their local caches are hot for particular bitrates), network latency, client device information (e.g., device type, hardware version, firmware version, client version), etc.

According to some implementations, client devices can share information (e.g., network addresses or domain name resolution data) about content delivery network edges that are determined to provide high quality network connectivity (e.g., in terms of latency, throughput, etc.). Such information might be derived, for example, as described in U.S. patent application Ser. No. 14/488,138 entitled Content Delivery Network Management filed on Sep. 16, 2014, the entire disclosure of which is incorporated herein by reference for all purposes.

The client device may be configured to aggregate, filter, and/or process the information it receives to make the decisions that improve its access to content. For example, the client device might use the information to generate parameters for use by a variable bit rate heuristic that governs the streaming of content. In another example, a client device might be configured to declare a content source as unreliable only if reported as such by some number of other client devices.

The client device may be configured to filter more or less of the information received from other client devices depending on its commonality with those client devices and/or the current operational context of the client device. For example, the client device might be configured to place more weight or emphasis on information that comes from its local subnet (e.g., a home network) as the information from client devices that are so closely related (e.g., in the same house) is highly likely to be relevant. Information from client devices having different types or degrees of commonality might be treated differently, e.g., client devices using the same ISP vs. client devices using the same edge vs. client devices using an edge in the same set of edges, etc. For example, if a client device is using an ISP in Seattle and receives information about a client device on an ISP in New York, that info can likely be discarded. More generally, each client can use information it knows about itself (i.e., where it is, how it is connected, what it is currently doing, etc.) to filter the information received to what is relevant to that device.

The information each client receives can be stored and updated as new information comes in. Alternatively, received information might only be used if it is currently relevant. In one example relating to supporting decision making for a variable bit rate heuristic, the information might be stored in a key value store that is referenced by the media player when making bit rate choices. Alternatively, the operational parameters of the heuristic might be modified directly as the information is received and filtered. In the latter case, the client device might act on the information when it is received, and then discard it (likely after passing it along to its neighbors). Such an imperative model, i.e., one in which relevant information is used as it comes in to change system parameters that already exist, might be advantageous for some applications in that, if the gossip protocol breaks down for some reason, the individual client device can continue to operate.

How frequently information is shared among client devices might be determined, for example, based on how much bandwidth is acceptable to consume with the sideband traffic of the gossip protocol. This may need to be balanced with the need for keeping the information current and useful. As will be appreciated, the nature of the information being shared, and the way in which it is being used will likely be determinative of its useful life. In some cases, information received via a gossip protocol can include time-to-live data because as the information ages it becomes less reliable and less useful. Client devices might also be configured to track recently received information (e.g., by maintaining hashes of recent messages) so that it can identify messages it has already received and ignore or discard them. Gossip protocol information might also include sequence numbers or time stamps to allow for the client devices to manage their use.

According to some implementations, the actions of a group of client devices can be coordinated. For example, using information shared via a gossip protocol, a group of client devices can learn that they are all accessing the same content. Through the use of an electoral or consensus process, one of the client devices makes a decision that the members of group then abide by. Alternatively, a consensus process might be based on a common algorithm, i.e., a provably convergent algorithm that results in the same decision given mostly the same data (with the amount of variability in input allowed being a primary characteristic of the particular algorithm). Those of skill in the art are aware of the various techniques by which such cooperation can be achieved. According to a particular class of implementations, various members of the Paxos family of protocols may be used depending on the particular decision or parameter. The original Paxos algorithm is described in *The Part-Time Parliament* by Leslie Lamport, ACM Transactions on Computer Systems 16, 2 (May 1998), pages 133-169, the entire disclosure of which is incorporated herein by reference for all purposes. Another example of a consensus decision might be to collectively share available bandwidth to improve the quality of the content received by each client device. This might involve coordination that relates to the capabilities of each of the client devices (e.g., whether each device is HD enabled or not).

In another example of the use of information shared by gossip protocol, a group of client devices using the same ISP are streaming the same content but are offset in time (e.g., one client is 5 minutes into the content, another 20 minutes, another 30, etc.). By sharing this information (i.e., each client device identifying the content it is streaming or recently streamed), a client device can determine that a content fragment it will soon be requesting has already been cached nearby, and request the cached fragment rather than requesting the fragment further up in the network hierarchy. The use of such information could even be extended to requesting fragments from a nearby neighbor that has already received them. For example, if a client device on a local area network is caching content, another client device on the same subnet could learn that the content it wants is already cached in the LAN, allowing it to access that content without accessing its ISP. A client device might even leverage the delivery of content to another client device by one mode to access that content by another, e.g., if a client device in a household wants to download content and knows that another client in the household is streaming that content, it can use that information to download the content from the streaming client, or vice versa.

As will be appreciated with reference to the foregoing, the decisions at the client device that can be based on information shared among client devices using a gossip protocol are quite diverse. Additional examples of such decisions include: selecting streaming technology, selecting download or streaming sources, selecting a content delivery mode, selecting a content access protocol, selecting CDNs, selecting edge devices, selecting source routing, configuring streaming optimization parameters (e.g., the number of concurrent fragments), or modifying detailed network configuration parameters (e.g., TCP window or MTU size adjustment).

As will also be appreciated, implementations enabled by the present disclosure are not limited to the use of information derived only from client devices. That is, while significant benefits may be realized without the involvement of the systems, devices, or processes from which client devices obtain content, implementations are contemplated which include varying levels of involvement of such systems, devices, or processes at various levels of the network hierarchy. For example, as mentioned above, centralized resources may be used to aid in the discovery of neighboring client devices that engage in gossip protocols as described herein. In another example, an ISP might participate in a gossip protocol for the purpose of providing at least some of the shared information to the client devices for the purpose of reducing its inbound bandwidth. Implementations are also contemplated which involve sophisticated interaction with centralized processes designed to optimize the use of network resources to deliver content (e.g., content delivery optimization heuristics 110 of FIG. 1). Examples of such server-side techniques are described in U.S. patent application Ser. No. 14/503,190 entitled Content Delivery filed on Sep. 30, 2014, the entire disclosure of which is incorporated herein by reference for all purposes.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A client device, comprising:
   memory;
   a network interface;
   a display; and
   one or more processors configured to:
   communicate using a gossip protocol with a plurality of neighbor client devices to acquire, using the gossip protocol, network condition information describing network parameters for a first remote platform from among a plurality of remote platforms delivering video content requested by at least one of the plurality of neighbor client devices for playback;
   receive a request for playback of first video content via a user interface of a media player operating on the client device;
   select the first remote platform using at least a portion of the network condition information;
   request, by the client device, the first video content from the first remote platform, wherein the first remote platform communicates with the at least one of the plurality of neighbor client devices using only one or more communication protocols that are different than the gossip protocol used between the plurality of neighbor client devices;
   receive the first video content from the first remote platform via the network interface; and
   initiate playback of the first video content on the display of the client device.

2. The client device of claim 1, wherein the network condition information includes one or more of: achieved bit rates, packet blocked data, edge device connections, content sources, access errors, routing information, failed connections, unreliable sources, Transmission Control Protocol (TCP) window sizes, maximum transmission unit (MTU) values, current stream characteristics, network latency, or client device information.

3. The client device of claim 1, wherein the one or more processors are configured to receive the first video content according to a variable bit rate heuristic, and wherein the one or more processors are further configured to use at least some of the network condition information as input to the variable bit rate heuristic.

4. The client device of claim 3, wherein the one or more processors are further configured to
   coordinate selecting by the client device and by at least one of the plurality of neighbor client devices the first remote platform and an identical input to a variable bit rate heuristic when requesting the first video content for playback, the selecting by the client device and the at least one of the plurality of neighbor client devices being coordinated using the network condition information acquired via the gossip protocol.

5. A computer-implemented method for a client device, comprising:
   communicating using a gossip protocol with a plurality of client devices to acquire, using the gossip protocol, network condition information describing network parameters for a remote platform delivering video content requested by at least one of the plurality of client devices for playback;
   identifying first content for playback;
   making one or more decisions about how to access the first content for playback using at least a portion of the network condition information;
   requesting, by the client device, the first content from the remote platform for playback in accordance with the one or more decisions, wherein the remote platform communicates with the at least one of the plurality of client devices using only one or more communication protocols that are different than the gossip protocol used between the plurality of client devices; and
   receiving the first content for playback from the remote platform.

6. The method of claim 5, wherein the network condition information includes one or more of: achieved bit rates, packet blocked data, edge device connections, content sources, access errors, routing information, failed connections, unreliable sources, Transmission Control Protocol (TCP) window sizes, maximum transmission unit (MTU) values, current stream characteristics, network latency, or client device information.

7. The method of claim 5, wherein the one or more decisions about how to access the first content relate to one or more of: selecting one or more parameters of a variable bit rate heuristic for accessing the first content, selecting a content source, selecting a content delivery mode, selecting a content access protocol, selecting a particular edge server of content delivery network, configuring streaming optimization parameters, or modifying detailed network configuration parameters.

8. The method of claim 5, wherein the plurality of client devices share one or more of: a common Internet service provider, a geographic area, a firewall, an access point, a cell tower, a proxy cache, a content delivery network edge cache, device type, hardware version, firmware version, client version, or cell carrier.

9. The method of claim 7, further comprising: selecting by each client device in a first subset of the plurality of client devices the remote platform and an identical input to a variable bit rate heuristic when requesting the first content for playback, the selecting by each client device in the first subset being coordinated using the network condition information acquired via the gossip protocol.

10. The method of claim 5, further comprising discarding the network condition information upon making the one or more decisions about how to access the first content.

11. The method of claim 5, further comprising storing the network condition information for subsequent decision making.

12. The method of claim 5, wherein the plurality of client devices share a common Internet service provider (ISP), and wherein the network condition information includes internal routing information of the ISP.

13. A computer program product, comprising one or more non-transitory computer-readable media having computer program instructions stored therein, the computer program instruction being configured such that, when executed by a client device, the computer program instructions cause the client device to:
communicate using a gossip protocol with a plurality of client devices to acquire, using the gossip protocol, network condition information describing network parameters for a remote platform delivering video content requested by at least one of the plurality of client devices for playback;
identify first content for playback;
make one or more decisions about how to access the first content for playback using at least a portion of the network condition information;
request, by the client device, the first content from the remote platform for playback in accordance with the one or more decisions, wherein the remote platform communicates with the at least one of the plurality of client devices using only one or more communication protocols that are different than the gossip protocol used between the plurality of client devices; and
receive the first content for playback from the remote platform.

14. The computer program product of claim 13, wherein the network condition information includes one or more of: achieved bit rates, packet blocked data, edge device connections, content sources, access errors, routing information, failed connections, unreliable sources, Transmission Control Protocol (TCP) window sizes, maximum transmission unit (MTU) values, current stream characteristics, network latency, or client device information.

15. The computer program product of claim 13, wherein the one or more decisions about how to access the first content relate to one or more of: selecting one or more parameters of a variable bit rate heuristic for accessing the first content, selecting a content source, selecting a content delivery mode, selecting a content access protocol, selecting a particular edge server of a content delivery network, configuring streaming optimization parameters, or modifying detailed network configuration parameters.

16. The computer program product of claim 13, wherein the plurality of client devices share one or more of: a common Internet service provider, a geographic area, a firewall, an access point, a cell tower, a proxy cache, a content delivery network edge cache, device type, hardware version, firmware version, client version, or cell carrier.

17. The computer program product of claim 15, wherein the computer program instructions are further configured to cause: selecting by each client device in a first subset of the plurality of client devices the remote platform and an identical input to a variable bit rate heuristic when requesting the first content for playback, the selecting by each client device in the first subset being coordinated using the network condition information acquired via the gossip protocol.

18. The computer program product of claim 13, wherein the computer program instructions are further configured to cause the client device to discard the network condition information upon making the one or more decisions about how to access the first content.

19. The computer program product of claim 13, wherein the computer program instructions are further configured to cause the client device to store the network condition information for subsequent decision making.

20. The computer program product of claim 13, wherein the plurality of client devices share a common Internet service provider (ISP), and wherein the network condition information includes internal routing information of the ISP.

* * * * *